United States Patent [19]

Nusbaum

[11] Patent Number: 5,406,068
[45] Date of Patent: Apr. 11, 1995

[54] AUTHORIZATION CARD FOR PURCHASE OF AMMUNITION AND METHOD OF USING

[76] Inventor: Robert D. Nusbaum, 143 Quietwood Dr., Vocaville, Calif. 95688

[21] Appl. No.: 222,377

[22] Filed: Apr. 4, 1994

[51] Int. Cl.⁶ ............................................. G06K 19/06
[52] U.S. Cl. .................................... 235/493; 235/487; 283/82
[58] Field of Search ................... 235/487, 493; 283/82

[56] References Cited

U.S. PATENT DOCUMENTS

| | | |
|---|---|---|
| 3,676,644 | 7/1972 | Vaccaro et al. . |
| 3,705,293 | 12/1972 | Cook . |
| 3,843,875 | 10/1974 | Goodstal ........................ 364/474.02 |
| 4,144,548 | 3/1979 | Roes . |
| 4,218,612 | 8/1980 | Krehl et al. . |
| 4,507,550 | 3/1985 | Fleer . |
| 4,863,196 | 9/1989 | Ohnishi et al. . |
| 4,998,753 | 3/1991 | Wichael . |
| 5,113,062 | 5/1992 | Fujita et al. . |

*Primary Examiner*—Harold Pitts
*Attorney, Agent, or Firm*—Thomas R. Lampe

[57] ABSTRACT

A rigid card has ammunition identification indicia and weapon identification indicia imprinted thereon. The card also bears a computer readable magnetic strip with the same information. The card is to be presented when an attempt is made to purchase ammunition. Purchase of a specific caliber of ammunition suitable for use in the weapon will be allowed only if an accessed data bank indicates that the weapon noted on the card is registered.

9 Claims, 1 Drawing Sheet

AUTHORIZATION CARD FOR PURCHASE OF AMMUNITION AND METHOD OF USING

TECHNICAL FIELD

This invention relates to a system for restricting the purchase of ammunition. More particularly, the invention relates to a documentational article to be presented when attempting the purchase of ammunition for a firearm to obtain prior clearance for such purchase. The invention also encompasses a method of utilizing the documentational article.

BACKGROUND ART

It is an unfortunate fact of life that numerous crimes are committed by persons employing hand guns and other firearms. It is axiomatic that firearms cannot be discharged without ammunition. The present invention relates to an apparatus and a method to restrict ammunition purchase, making the ammunition available only when one presents evidence that the ammunition is to be used with a registered weapon.

As will be described in greater detail below, the invention has as a fundamental aspect thereof use of a documentational article of a specific type to be presented when attempting purchase of ammunition for a firearm to obtain clearance for such purchase. The documentational article has the somewhat general appearance of a charge card or credit card of the type issued by banks and savings and loan institutions, among others.

A search of the prior art located the following United States patents: U.S. Pat. No. 5,113,062, filed May 12, 1992, U.S. Pat. No. 4,218,612, issued Aug. 19, 1980, U.S. Pat. No. 4,998,753, issued Mar. 12, 1991, U.S. Pat. No. 4,144,548, issued Mar. 13, 1979, U.S. Pat. No. 4,863,196, issued Sep. 5, 1989, U.S. Pat. No. 3,705,293, issued Dec. 5, 1972, U.S. Pat. No. 4,507,550, issued Mar. 26, 1985 and U.S. Pat. No. 3,676,644, issued Jul. 11, 1972.

None of the located patents disclose an apparatus or a method for controlling the sale of ammunition. However, U.S. Pat. No. 4,998,753 is of note since it discloses a driver's license in the form of a rigid plastic card similar to charge cards issued by banks and savings and loan institutions. The card has imprinted, embossed or encoded thereon certain information concerning the driver.

DISCLOSURE OF INVENTION

The present invention relates to a documentational article to be presented when attempting purchase of ammunition for a firearm to obtain clearance for such purchase.

The documentational article includes a rigid card having front and back sides.

Ammunition identification indicia is on at least one of the sides of the card identifying a specific bullet caliber.

Weapon identification indicia is on at least one of the sides of the card identifying a specific weapon serial number.

A computer readable magnetic strip is on at least one of the sides of the card, the strip being encoded with the specific bullet caliber identified by the ammunition identification indicia and further encoded with the specific weapon serial number identified by the weapon identification indicia.

The method of the present invention includes the step of issuing to the owner of a registered firearm a documentational article of the type indicated above. The documentational article is to be presented when attempting to purchase ammunition for a registered firearm.

The card is presented to a seller of ammunition at the time purchase of ammunition for the registered firearm is attempted.

A data base of registered firearm serial numbers is checked at the time of the attempted purchase to determine whether or not the specific weapon serial number identified by the weapon identification indicia on the card is in the data base of registered firearms.

Ammunition purchase is permitted only if the specific weapon serial number identified by the weapon identification indicia is in the data base.

Other features, advantages, and objects of the present invention will become apparent with reference to the following description and accompanying drawings.

BEST MODE FOR CARRYING OUT THE INVENTION

Figure 1:
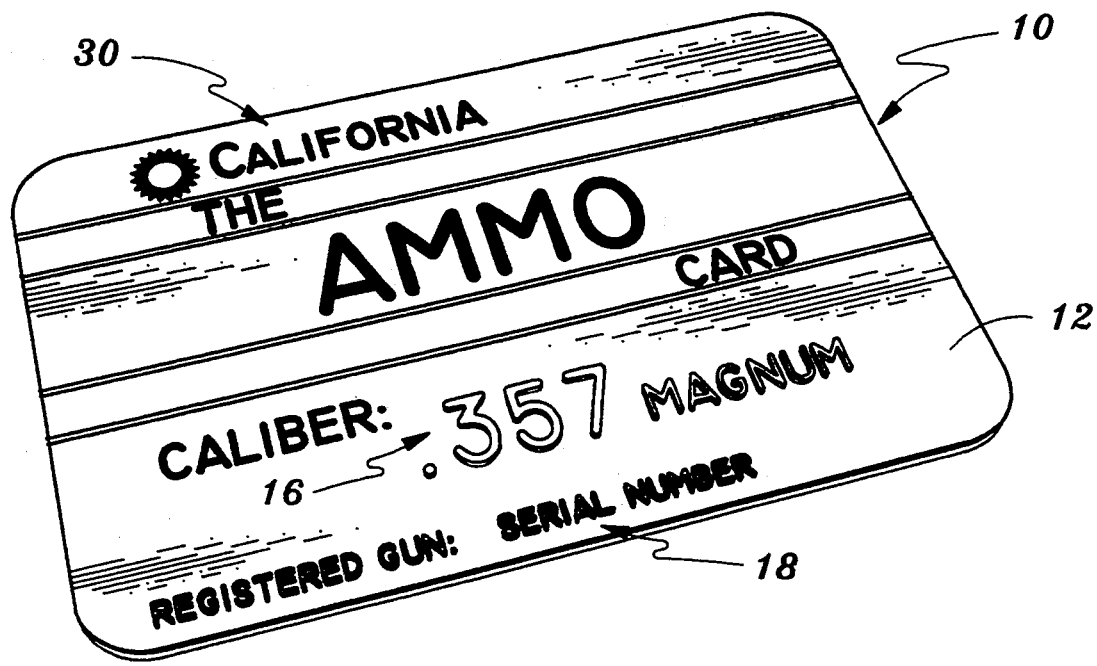
FIG. 1 is a perspective view of a documentational article constructed in accordance with the teachings of the present invention showing the front side of the card thereof.
Figure 2:
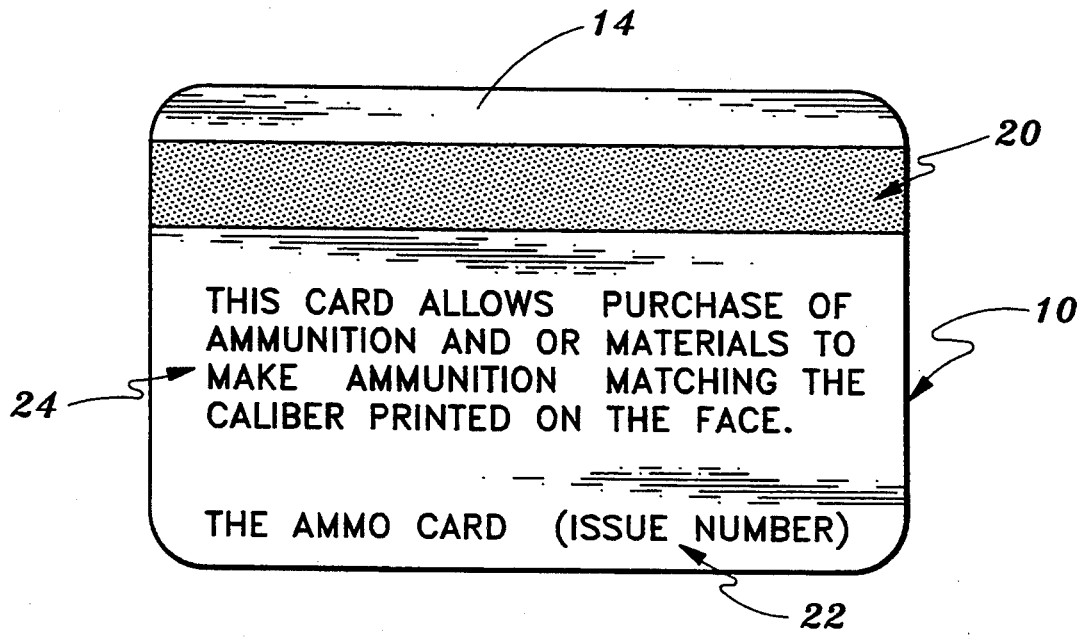
FIG. 2 is an elevational, rear view of the documentational article.

Referring now to the drawings, a documentational article constructed in accordance with the teachings of the present invention is illustrated. The article includes a rigid card 10 of plastic. The dimensions of the card are preferably those of a conventional credit card made available by banks and other financial institutions, i.e., approximately three and three eighths inches by two and one eighth inches. The card 10 has a front 12 and a back 14.

Ammunition identification indicia 16 is imprinted on the face of the card identifying a specific caliber of ammunition, in the present instance .357 magnum.

Weapon identification indicia 18 is also imprinted on the front of the card. In the illustrated example, the generic term serial number designates where a specific weapon serial number will be imprinted in the card when in actual use.

It is to be understood that the serial number is that of a registered gun which is listed in a data base at the United States Department of Justice or other appropriate government agency, state or federal. The serial number is placed in the data bank at the time the weapon is purchased. At the time of purchase of the weapon, the card 10 is issued to the purchaser with the weapon serial number and ammunition caliber thereof imprinted on the card.

An object of the present invention is to allow only the owner of a specific registered weapon to purchase ammunition and/or materials to make ammunition of a caliber suitable for the weapon. When an attempt is made to purchase ammunition (including ammunition materials) the ammunition seller must verify that the weapon identified on the card by weapon identification indicia 18 is registered. If the serial number does clear the weapon as registered, the dealer can sell ammunition but will be obliged to sell the purchaser only ammunition of the caliber indicated on the card by ammunition identification indicia 16.

To streamline the process, a computer readable magnetic strip 20 of conventional nature is located on the back 14 of the card. The magnetic strip is encoded when the weapon is purchased and registered with the specific bullet caliber identified by ammunition identification indicia 16 and also encoded with the specific weapon serial number identified by the weapon identification indicia 18.

Through the use of this invention, persons with stolen and/or illegal weapons will have a much more difficult time obtaining the ammunition they require for the weapon or weapons at their disposal. It is anticipated that when "clear" or similar clearance language prints out on the computer reading the magnetic strip, it can also serve to indicate that there have been no criminal prosecutions or convictions involving the weapon for which ammunition is being sought. Of course, this will entail input from law enforcement agencies around the country to ensure that the data bank is kept current in this regard. Furthermore, the data bank can also incorporate information regarding weapons reported lost or stolen. If a lost of stolen weapon is noted on the data bank, clearance for ammunition purchase will not be granted. If desired, the system can also provide for the confiscation of a card and/or weapon if criminal acts are indicated in the data base.

It is believed that this system represents a powerful approach to controlling use of non-registered, stolen or illegal weapons.

In the illustrated embodiment, the card 10 is also imprinted on the back thereof with card issue indicia in the form of a specific card issue number, it being understood that each card bears its own unique number.

The back of the card also bears card use indicia 24 advising that the card authorizes purchase of ammunition (including ammunition components) only of the caliber identified by the ammunition identification indicia.

The illustrated card 10 also bears geographic identification indicia 30 identifying a state, in this instance California, where the card was issued.

I claim:

1. A documentational article to be presented when attempting purchase of ammunition for a firearm to obtain clearance for such purchase, said documentational article comprising:
    a rigid card having front and back sides;
    ammunition identification indicia on at least of the of sides of said card identifying a specific bullet caliber;
    weapon identification indicia on at least one of the sides of said card identifying a specific weapon serial number; and
    a computer readable magnetic strip on at least one of the sides of said card encoded with the specific bullet caliber identified by said ammunition identification indicia and further encoded with the specific weapon serial number identified by said weapon identification indicia.

2. The documentational article of claim 1 additionally comprising geographic identification indicia on at least one of the sides of said card identifying a specific state.

3. The documentational article according to claim 1 whereon said card is formed of rigid plastic.

4. The documentational article according to claim 1 wherein said ammunition identification indicia and said weapon identification indicia are readily visually perceptible, spaced from one another, and located on the front side of said card.

5. The documentational article according to claim 4 wherein said computer readable magnetic strip is on the back side of said card.

6. The documentational article according to claim 1 additionally comprising card issue indicia on at least one of the sides of the card identifying a card issue number.

7. The documentational article according to claim 1 additionally comprising card use indicia on at least one of the sides of the card advising that the card authorizes purchase of ammunition of the caliber identified by the ammunition identification indicia.

8. A method of controlling the purchase of ammunition to a specific registered firearm, said method comprising the steps of:
    issuing to the owner of a registered firearm a documentational article to be presented when attempting purchase of ammunition for the registered firearm, said documentational article comprising a rigid card having front and back sides, ammunition identification indicia on at least one of the sides of the card identifying the specific bullet caliber used by said registered firearm, weapon identification indicia on at least one of the sides of said card identifying the serial number of the registered firearm, and a computer readable magnetic strip on at least one of the sides of said card encoded with the specific bullet caliber identified by said ammunition identification indicia and further encoded with the specific weapon serial number identified by said weapon identification indicia;
    presenting said card to a seller of ammunition at the time purchase of ammunition for said registered firearm is attempted;
    checking a data base of registered firearm serial numbers to determine whether or not the specific weapon serial number identified by the weapon identification indicia on the card is in the data base; and
    permitting ammunition purchase by the bearer of the documentational article only if the specific weapon serial number identified by the weapon identification indicia is in the data base.

9. The method according to claim 7 further including the step of restricting ammunition purchase to the specific bullet caliber identified by said ammunition identification indicia.

* * * * *